United States Patent [19]
Leonhartsberger

[11] Patent Number: 5,297,952
[45] Date of Patent: Mar. 29, 1994

[54] INJECTION MOLDING MACHINE WITH ARTICULATED CLOSURE

[75] Inventor: Heinrich Leonhartsberger, Schwertberg, Austria

[73] Assignee: Engel Maschinenbau Gesellschaft m.b.H., Schwertberg, Austria

[21] Appl. No.: 942,732

[22] Filed: Sep. 9, 1992

[30] Foreign Application Priority Data

Sep. 12, 1991 [AT] Austria .................. A1822/91

[51] Int. Cl.⁵ ........................................... B29C 45/66
[52] U.S. Cl. ............................. 425/593; 425/451.6
[58] Field of Search ............ 425/589, 592, 593, 451.5, 425/451.6

[56] References Cited

U.S. PATENT DOCUMENTS

| | | | |
|---|---|---|---|
| 3,245,122 | 4/1966 | Maurer | 425/593 |
| 3,577,596 | 5/1971 | Bullard | 425/151 |
| 4,202,522 | 5/1980 | Hanas et al. | 425/192 R |
| 5,122,051 | 6/1992 | Joyner | 425/593 |

FOREIGN PATENT DOCUMENTS

| | | |
|---|---|---|
| 354065 | 6/1974 | Austria . |
| 362571 | 6/1976 | Austria . |
| 0311133 | 10/1987 | European Pat. Off. . |
| 1931432 | 1/1971 | Fed. Rep. of Germany . |
| 1729146 | 6/1971 | Fed. Rep. of Germany . |
| 3029597 | 3/1982 | Fed. Rep. of Germany . |

Primary Examiner—Tim Heitbrink
Attorney, Agent, or Firm—Notaro & Michalos

[57] ABSTRACT

An injection molding machine has a machine frame, a stationary and a movable die platen, as well as a front plate supporting a closure mechanism. The front plate on which the movable die platen is supported via the closure mechanism and the stationary die platen are without bars and connected exclusively via the machine frame. The closing force occurring during the closing process and the lifting force occurring during the injection process between the front plate and the die platen are borne only by the machine frame. The movable die platen is guided on at least one rail supported on the machine frame. The closure mechanism is a toggle joint whose levers are rotatably articulated, on the one hand, at the movable die platen and, on the other hand, at the front plate.

13 Claims, 4 Drawing Sheets

INJECTION MOLDING MACHINE WITH ARTICULATED CLOSURE

FIELD AND BACKGROUND OF THE INVENTION

The invention relates to an injection molding machine with a machine frame, a stationary and a movable die platen as well as a front plate supporting a closure mechanism wherein the front plate on which is supported the movable die platen via the closure mechanism and the stationary die platen are connected without bars, exclusively via the machine frame so that the closing force occurring during the closing process and the lifting force occurring during injection between the front plate and the die platen are borne only by the machine frame wherein the movable die platen is guided on at least one rail supported on the machine frame.

An injection molding machine of this type is known from European Patent Document EU-0 311 133-B1. Since an injection molding machine of this type does not comprise any bars, the closing forces can only be borne by the machine frame.

An injection molding machine of this type offers better access to the injection molding die so that retooling time can be considerably reduced. Difficulties arise, however, in that the closing forces which occur cannot be borne centrally. According to the cited patent document the problem was solved in such a way that between the hydraulic piston which moves the movable die platen and the die platen itself, an articulation is provided which allows the die platen to tilt about a horizontal axis. It is thereby ensured that during the injection molding process the two die platens are always parallel to each other.

The use of an articulation mechanism, however means greater constructional expenditures.

SUMMARY OF THE INVENTION

An object of the present invention is to provide an injection molding machine of the type stated initially which can exert very high locking forces between the locking mechanism and the movable die platen without additional articulation needs.

This is achieved according to the invention in that the closure mechanism is a toggle joint whose lever is rotatably articulated on one end, to the movable die platen and, at an opposite end, to the front plate.

It is advantageously provided that the toggle joint is movable in a vertical plane and that it is a simple toggle joint whose knuckle joint is released in the downward direction.

A further feature of the invention provides that at the bearings of the levers on the front plate and on the movable die platen, arms are articulated which jointly carry the drive for the toggle joint.

In this way the drive for the toggle joint, for example a hydraulic piston-cylinder unit, is carried along with the motion of the toggle joint and no special guidance device is necessary.

A yoke-like connector part is advantageously articulated to the arms, on which the drive for the toggle joint is fastened. In this way, it is insured that the hydraulic piston always pushes the knuckle at the correct joint angle.

In order to ensure good guidance of the die platen during movement, it is further provided that the movable die platen is secured resiliently on the machine frame against being lifted off where it is guided on the rail. A rail of this type is advantageously provided on the front as well as also on the rear side of the machine frame. In the direction of displacement, the die platen comprises two glide shoes with which it is guided on the rail. Thereby a tilting of the die platen and consequently of the mold half, is avoided.

A further feature of the invention provides that for molds of different thickness a single spindle which is adjustably supported in the front plate is provided, at which the front plate-side lever of the toggle joint is articulated. The single spindle on which the toggle joint is articulated permits a very rapid setting of the machine to different mold heights. But it is not necessary, as for example in a four-bar machine, to pay particular attention to a tension regulator.

Accordingly, a further object of the present invention is to provide an injection molding machine comprising: a machine frame; a stationary die platen connected to the machine frame; a front plate connected to the machine frame at a location spaced from the stationary die platen, the front plate being connected without bars to the stationary die platen and exclusively by the machine frame so that closing forces occurring during a closing process and lifting forces occurring during an injection process between the front plate and the stationary die platen are borne only by the machine frame; at least one rail on the machine frame between the front plate and the stationary die platen; a movable die platen guided on the at least one rail and supported on the machine frame; and closure means connected between the front plate and the movable die platen for moving the movable die platen toward and away from the stationary die platen, the closure means comprising a toggle joint rotatably articulated between the movable die platen and the front plate.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the following an embodiment of the invention will be described in detail in conjunction with the drawings, wherein.

DESCRIPTION OF THE PREFERRED EMBODIMENT

Figure 1:
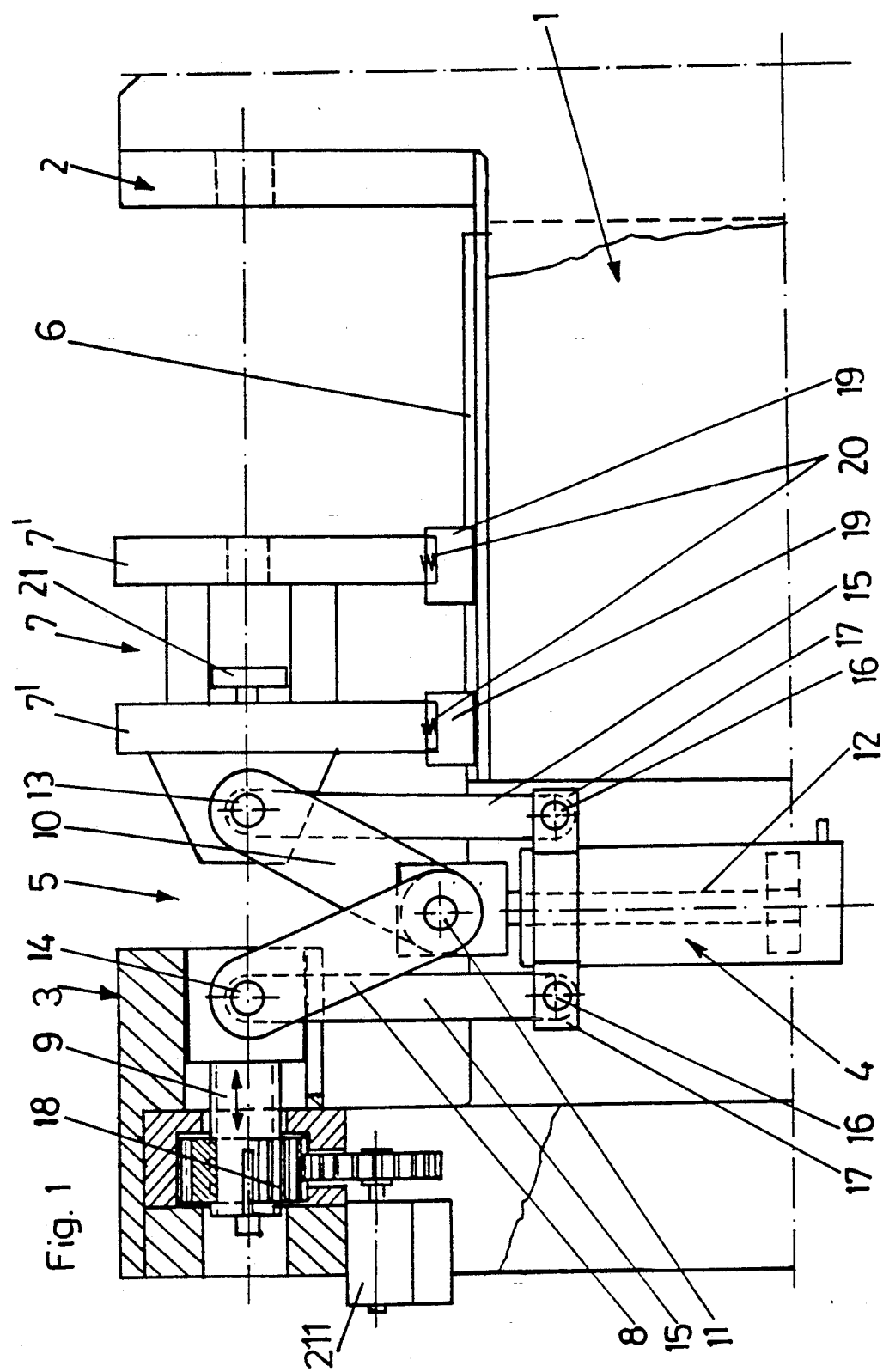
FIG. 1 is a schematic side view of an injection molding machine according to the invention in the open position.
Figure 2:
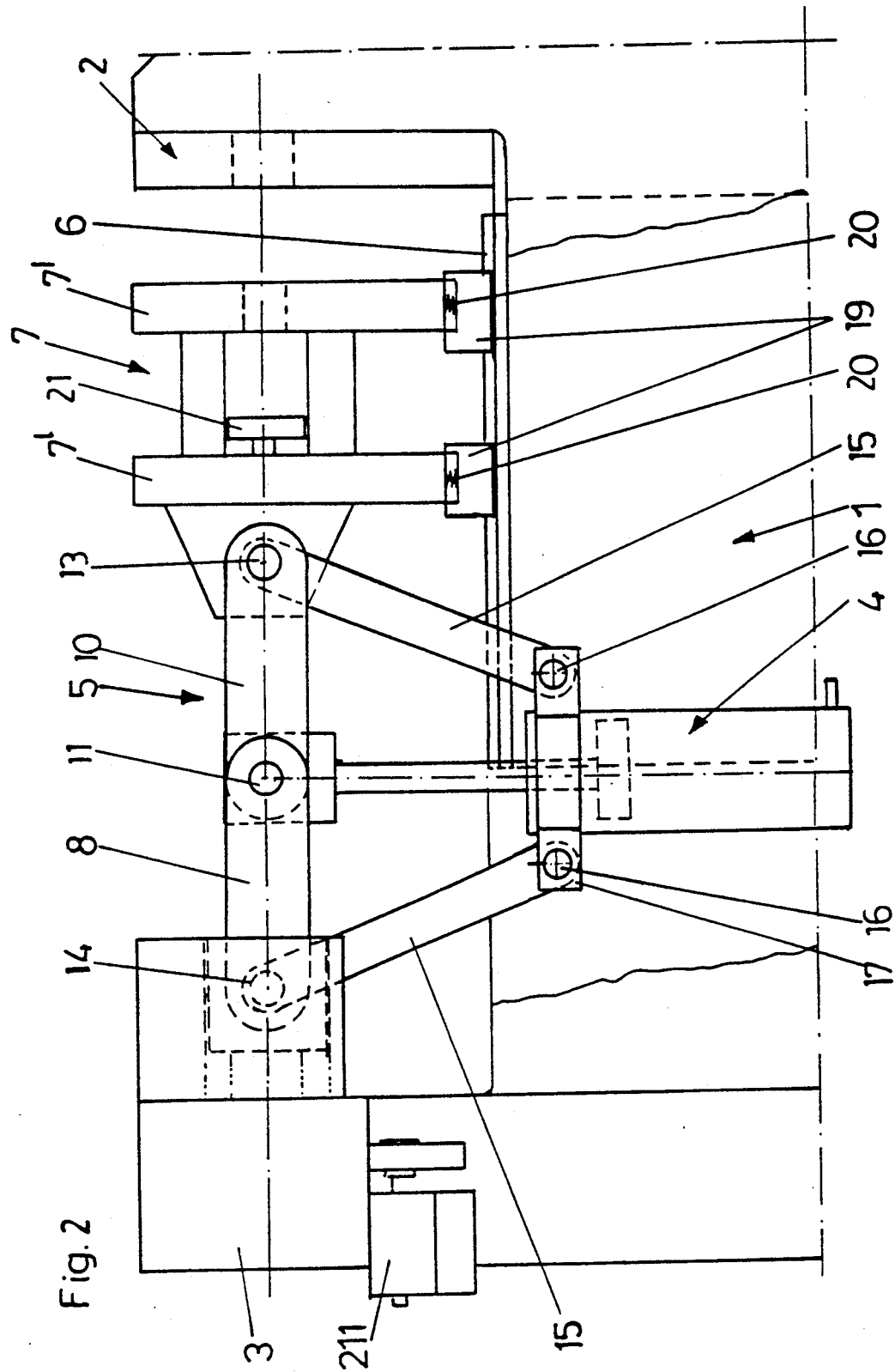
FIG. 2 is a schematic side view of the injection molding machine according to the invention in the closed position.

An essential part of the injection molding machine according to the invention is the machine frame 1 shown in FIGS. 1 and 2, which is integrally connected to a stationary die platen 2 and a front plate 3. The machine frame 1 together with the stationary die platen 2 and the front plate 3 are advantageously cast of nodular cast iron. The machine frame 1 is constructed between the front plate 3 and the stationary die platen 2, in top view (not shown), in two pieces with a front and a rear connecting wall. The two connecting walls define a tub therebetween in which a piston-cylinder unit 4, which forms the drive mechanism for a toggle joint 5, is movable. Only one wall of the frame is visible in FIGS. 1 and 2.

One rail 6 is mounted on each of the front and rear connecting walls of the machine frame. A movable die platen 7 is mounted on and between the rails 6, only one rail being visible in FIGS. 1 and 2.

The toggle joint 5 is positioned between the front plate 3 and the movable die platen 7, which is articulated by a lever 8 via a spindle 9, indirectly to the front plate 3 and by a second lever 10 directly to the die platen 7.

A piston 12 of the hydraulic piston-cylinder unit 4 engages a central articulation or knuckle joint 11 of the toggle joint 5. The lever 10 is connected to the movable die platen 7 by a pivot joint or articulation 13, and lever 8 is connected to spindle 9 by a pivot joint or articulation 14, which is axially adjustable in the front plate 3. Articulated arms 15 are connected at the joints 13 and 14. Arms 15 are also connected via articulations or joints 16 to the piston-cylinder unit 4. Consequently the arms 15 carry the piston-cylinder unit 4. This forms a yoke-like connector part 17 on the piston-cylinder unit 4.

In order to set the mold height or distance on the injection molding machine, it is sufficient to rotate a rod spur 18 by means of a motor, preferably an electromotor 211, whereupon the spindle 9 is rotated and moved axially in the direction of the double arrow in FIG. 1. Simultaneously the toggle joint 5 and the movable die platen 7 are carried along.

A single spindle 9 positioned at the center plane of the machine is provided so that when the mold closes, no tension differential exists.

The movable die platen 7 is supported by means of glide shoes 19 on the rails 6. The shoes 19 and consequently the die platen 7 are secured against being lifted off the rails 6. In this way the directed force of the piston 12, when closing the toggle joint 5, is absorbed.

Springs 20 are provided between the shoes 19 and the movable die platen 7, which are preferably disk springs which permit an easy tilting of the die platen 7 so that the die platens 2, 7 with their mold halves, rest parallel against each other even if during the injection process a slight deformation of the machine frame 1 or the unit machine frame, stationary die platen 2 or front plate 3, occur.

Figure 3:
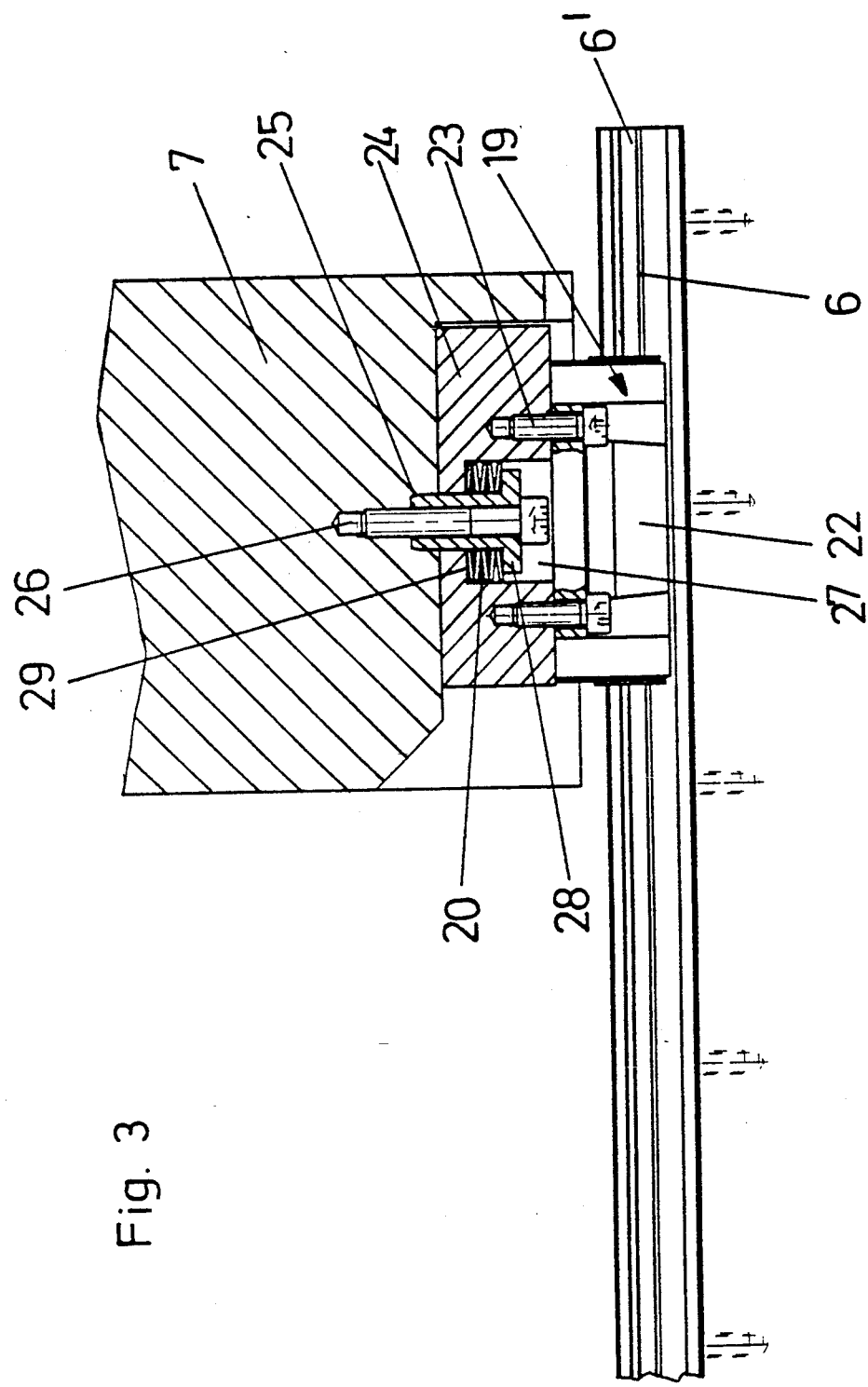
FIG. 3 is a sectional view through a guidance structure for a movable die platen before operation of a closure mechanism, and on an enlarged scale.
Figure 4:
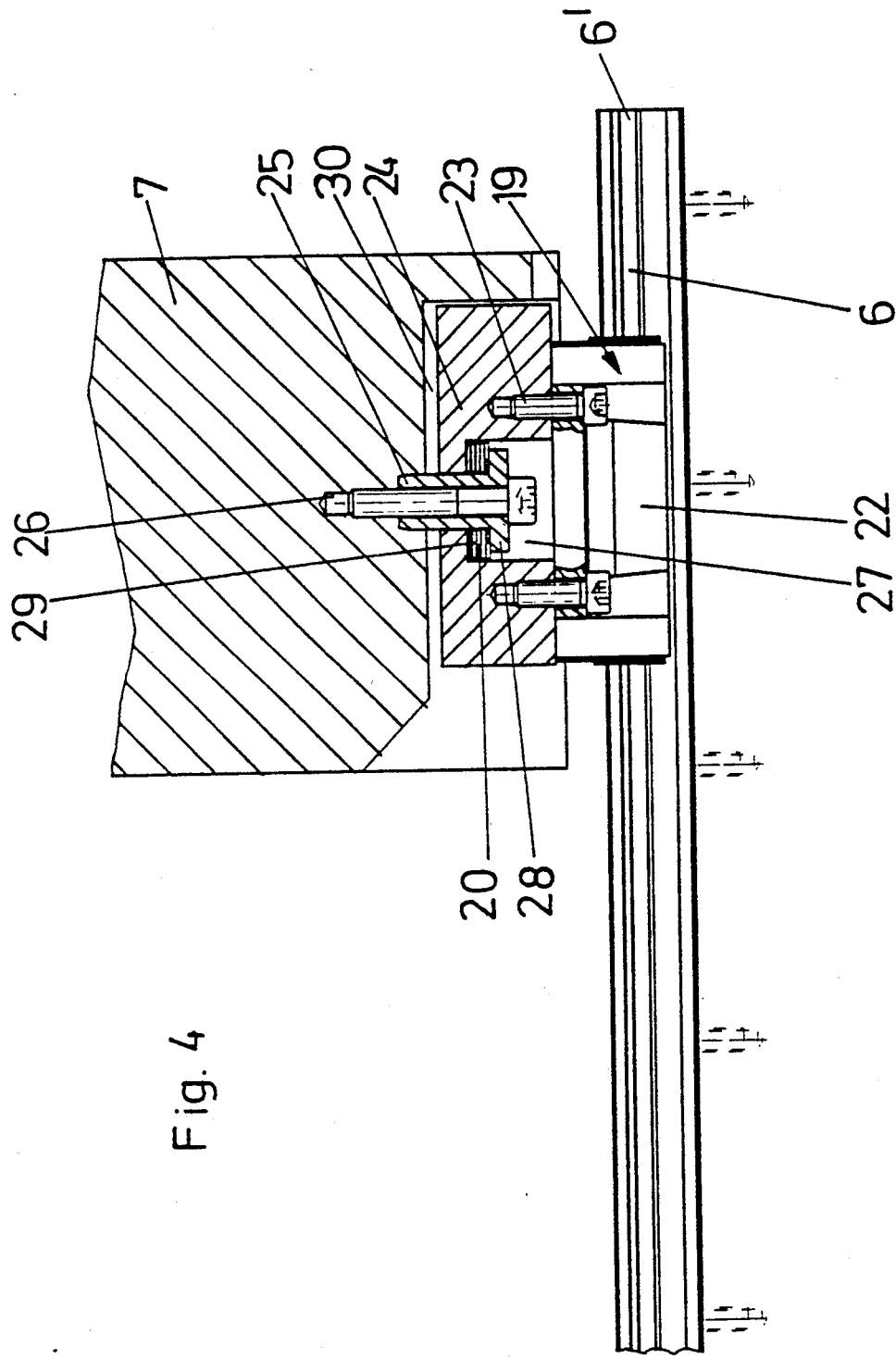
FIG. 4 is a view like FIG. 3 but during operation of the closure mechanism.

Referring now to FIGS. 3 and 4, for greater detail, each glide shoe 19 comprises a guidance part 22 which hooks underneath webs 6' of rails 6 and consequently cannot be lifted upwardly off the rail 6. The guidance part 22 is connected via screws 23 to a holding part 24. The holding part 24 is fastened by way of a sleeve 25 and a main screw or bolt 26 to the movable die platen 7.

Each holding part 24 has a recess 27 into which the sleeve 25 and the bolt 26 project. The sleeve 25 and the bolt 26 form the holding arrangement for the movable die platen 7 on the glide shoe 19.

Disk springs 20 are placed between a horizontal web 28 of the sleeve 25 and the bottom 29 of the holding part 24.

If none of the components that are urged upwardly by the closure mechanism act upon the movable die platen 7, the die platen 7 rests on the holding part 24 and is consequently guided directly on the rail 6 via the glide shoe 19. Upon the occurrence of an upwardly directed force, the movable die platen 7, as shown in FIG. 3, is lifted by a short distance upwardly against the pressure of the disk spring 20 so that a gap 30 in FIG. 4 is closed as shown in FIG. 3.

In the absence of the force the movable die platen 7 again sinks back in to the starting position shown in FIG. 3.

The disk springs 20 make a slight tilting of the die platen 7 possible so that the die platens 2, 7 with their mold halves, rest parallel against each other even if during the injection process a slight deformation of the machine frame 1 or the unit machine frame, the stationary die platen 2, and/or the front plate 3, occur.

The springs 20 can also be disposed between the rails 6 and the machine frame 1 wherein, when tilting the movable die platen 7, the rails 6 would tilt also. Thereby the movable die platen 7 which comprises two plates 7' disposed at a distance from each other, the guidance on the rails 6 is improved. The rear platen 7' lastly carries an ejector 21 in addition.

Instead of the hydraulic piston-cylinder unit 4, another drive, for example an electromechanical drive, preferably a servomotor could also be provided.

While a specific embodiment of the invention has been shown and described in detail to illustrate the application of the principles of the invention, it will be understood that the invention may be embodied otherwise without departing from such principles.

What is claimed is:

1. An injection molding machine comprising:
    a machine frame;
    a stationary die platen connected to the machine frame;
    a front plate connected to the machine frame at a location spaced from the stationary die platen, the front plate being connected without bars to the stationary die platen and exclusively by the machine frame so that closing forces occurring during a closing process and lifting forces occurring during an injection process between the front plate and the stationary die platen are borne only by the machine frame;
    at least two rails on the machine frame between the front plate and the stationary die platen;
    a movable die platen guided on the at least two rails and supported on the machine frame; and
    closure means connected between the front plate and the movable die platen for moving the movable die platen toward and away from the stationary die platen, the closure means comprising a toggle joint rotatably articulated between the movable die platen and the front plate;
    the movable die platen being resiliently mounted to the at least two rails for bracing the movable die platen against being lifted from the rails.

2. An injection molding machine according to claim 1, wherein the toggle joint is mounted for movement in a vertical plane in order to move the movable die platen in a substantially horizontal plane.

3. An injection molding machine according to claim 1, wherein the toggle joint comprises a pair of levers pivotally connected to each other at a knuckle joint, one of said levers being pivotally connected opposite said knuckle joint to the front plate and the other lever being pivotally connected opposite said knuckle joint to the movable die platen, said closure means being constructed so that the knuckle joint moves upwardly and downwardly when the movable die platen moves with respect to the stationary die platen.

4. An injection molding machine according to claim 3, wherein said closure means includes a drive for moving the pair of levers, a first arm articulated to a pivot connection between said one of said levers and the front plate and a second arm articulated to a pivot connection between said other of said levers and the movable die platen, each of the first and second arms being articulated to the drive for carrying the drive.

5. An injection molding machine according to claim 4, including a yoke connector connected to the drive, each of the first and second arms being articulated to the yoke connector for carrying the drive.

6. An injection molding machine according to claim 5, wherein said drive includes an actuator movably mounted to the drive, said actuator being connected to the knuckle joint for moving the knuckle joint upwardly and downwardly with respect to the yoke connector.

7. An injection molding machine according to claim 1, wherein the movable die platen comprises a pair of spaced apart platen portions each mounted for guiding movement along the rail and spaced from each other in the direction of movement of the movable die platen along the rail.

8. An injection molding machine according to claim 7, including a pair of spaced apart glide shoes slidably mounted to each rail, each shoe being connected to one of the movable die platen portions.

9. An injection molding machine according to claim 8, including a spring mounted between each platen portion and a respective shoe for resiliently mounting the movable die platen to the machine frame.

10. An injection molding machine according to claim 1, including a single spindle mounted for rotation and axial movement to the front plate, one end of the toggle joint being pivotally articulated to the spindle for connecting the toggle joint to the front plate, the spindle being rotatable and axially movable for adjusting a distance between the movable and stationary die platens.

11. An injection molding machine according to claim 8, including a spindle mounted for rotation and axial movement to the front plate, the lever articulated to the front plate being articulated to the spindle and the spindle being movable axially for adjusting a distance between the movable and stationary die platens.

12. An injection molding machine according to claim 8, including a holding arrangement between the shoe and the movable die platen and a spring in the holding arrangement for urging the movable die platen toward the shoe, the spring being compressed when upward force is exerted on the movable die platen to allow the movable die platen to lift slightly from the shoe.

13. An injection molding machine according to claim 12, wherein the holding arrangement comprises a holding part fixed to the shoe and including a recess containing the spring, and a sleeve fixed to the movable die plate and engaged against the spring in the recess.

* * * * *